United States Patent
Haseno

(10) Patent No.: US 6,728,476 B1
(45) Date of Patent: Apr. 27, 2004

(54) APPARATUS AND METHOD FOR THUMBNAIL PICTURE DATA READOUT

(75) Inventor: Shinichi Haseno, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/090,731

(22) Filed: Jun. 4, 1998

(30) Foreign Application Priority Data

Jun. 9, 1997 (JP) .......................................... P09-151304

(51) Int. Cl.$^7$ ........................... H04N 5/781; H04N 5/85; H04N 5/90; H04N 5/91
(52) U.S. Cl. ...................................... 386/125; 386/126
(58) Field of Search ............................. 386/45, 38, 70, 386/95, 108, 117, 125, 126; 348/231–233; 369/275.3

(56) References Cited

U.S. PATENT DOCUMENTS

| | | | |
|---|---|---|---|
| 4,789,979 A | * 12/1988 | Hiraoka et al. | 369/275.4 |
| 4,827,347 A | * 5/1989 | Bell | 348/333 |
| 5,093,731 A | 3/1992 | Watanabe et al. | |
| 5,164,831 A | 11/1992 | Kuchta et al. | |
| 5,206,931 A | 4/1993 | Kimura et al. | |
| 5,440,401 A | * 8/1995 | Parulski et al. | 386/124 |
| 5,477,264 A | 12/1995 | Sarbadhikari et al. | |
| 5,528,293 A | 6/1996 | Watanabe | |
| 5,576,757 A | 11/1996 | Roberts et al. | |
| 5,581,311 A | 12/1996 | Kuroiwa | |
| 5,656,348 A | * 8/1997 | Kudo et al. | 369/275.3 |
| 5,689,303 A | 11/1997 | Kuroiwa | |
| 5,724,579 A | 3/1998 | Suzuki | |
| 5,793,517 A | 8/1998 | Aizawa et al. | |
| 5,819,261 A | * 10/1998 | Takahashi et al. | 707/3 |
| 5,943,517 A | 8/1999 | Sato | |
| 5,987,176 A | * 11/1999 | Imaizumi et al. | 382/232 |
| 6,020,920 A | * 2/2000 | Anderson | 348/231 |
| 6,020,982 A | 2/2000 | Yamauchi et al. | |
| 6,065,015 A | * 5/2000 | Kazami | 348/233 |
| 6,101,292 A | 8/2000 | Udagawa et al. | |
| 6,104,430 A | 8/2000 | Fukuoka | |
| 6,192,191 B1 | 2/2001 | Suga et al. | |
| 6,288,743 B1 | 9/2001 | Lathrop | |
| 6,310,647 B1 | 10/2001 | Parulski et al. | |
| 6,377,745 B2 | * 4/2002 | Akiba et al. | 386/68 |
| 6,404,981 B1 | 6/2002 | Kumagai et al. | |

FOREIGN PATENT DOCUMENTS

| | | |
|---|---|---|
| EP | 0619673 A1 | 10/1994 |
| EP | 0 755 162 A2 | 1/1997 |
| JP | 3-117181 | 5/1991 |
| JP | 6-284368 | 10/1994 |
| JP | 06303533 A | 10/1994 |
| JP | 07274108 A | 10/1995 |

OTHER PUBLICATIONS

Cohen, Harvey A.; "Access and Retrieval from Image Databases Using Image Thumbnails"; Aug. 1996; International Symposium of Signal Processing and its Applications; pp. 427–428.

"Video CCD Based Portable Digital Still Camera", Chan et al., IEEE, Aug. 1995, pp. 455–459.

"DCT–Based Still Image Compression ICS With Bit–Rate Control", Nakagawa et al., IEEE, Aug. 1992, pp. 711–717.

* cited by examiner

*Primary Examiner*—Thai Tran
*Assistant Examiner*—Polin Chieu
(74) *Attorney, Agent, or Firm*—Lerner, David, Littenberg, Krumholz & Mentlik, LLP

(57) ABSTRACT

A picture recording and reproducing method in which thumbnail picture data can be read out promptly. At step S11, an area is secured from the outer rim side of a magnetic disc for setting a recording area for a main picture file. At step S12, a floppy disc controller (FDC) is controlled to write a main picture file by a floppy disc drive (FDD) in the area on the magnetic disc as determined at step S11. At step S13, an area is secured from the inner rim side of the magnetic disc for setting a recording area for a thumbnail picture file. At step S14, the FDC is controlled to write a thumbnail picture file by the floppy disc drive (FDD) in the area on the magnetic disc as determined at step S13. This alternately records the main picture file and the thumbnail picture file from both ends of the data area of the magnetic disc.

10 Claims, 8 Drawing Sheets

DISC HYSTERESIS

001.JPG
002.JPG
(003.JPG) ← DELETED BEFORE RECORDING 010.JPG
004.JPG
005.JPG ← THUMBNAIL PICTURE FILE 005.411 WAS NOT REORDED
006.JPG
007.JPG
008.JPG
009.JPG
010.JPG ← RECORDED AFTER DELETING 003.JPG

FIG.7

THUMBNAIL MANAGEMENT TABLE

| FILE NOS. | MAIN PICTURE FILES | CORRESPONDING THUMBNAIL ADDRESSES |
|---|---|---|
| 1 | 001.JPG | h |
| 2 | 002.JPG | g |
| 3 | 004.JPG | e |
| 4 | 005.JPG | 0 |
| 5 | 006.JPG | d |
| 6 | 007.JPG | c |
| 7 | 008.JPG | b |
| 8 | 009.JPG | a |
| 9 | 010.JPG | f |

FIG.8

APPARATUS AND METHOD FOR THUMBNAIL PICTURE DATA READOUT

BACKGROUND OF THE INVENTION

1. Field of the Invention

This invention relates to a picture recording method and apparatus and a picture reproducing method and apparatus. The present invention may be applied with advantage to, for example, a digital camera device for digitizing a picture and for recording the digitized picture.

2. Related Art

Recently, as personal computers are coming into widespread use, digital camera devices, configured for digitizing and recording pictures, are stirring up notice as picture recording devices. As the digital camera devices, there are known such devices in which a pre-set number of object are digitized and recorded in a pre-set recording medium such as a memory card as still-picture data so that the still pictures can be subsequently outputted to a monitor of the personal computer. The digital camera device usually has the function as a picture reproducing device of displaying a picture recorded on a pre-set recording medium from a picture display unit, such as a LCD panel, provided on the back side of the device. In addition, the digital camera device occasionally has the function of editing picture data such as erasing a recorded picture corresponding to an unneeded picture or an unsatisfactory picture.

Meanwhile, when recording plural still pictures on a pre-set recording medium, samples of recorded pictures are desirably recorded on the recording medium for convenience in picture display during reproduction or in picture editing operations. This sample of pictures is usually termed a thumbnail and frequently recorded as thumbnail picture data corresponding to decimated data of the recorded picture. In reproducing a picture, only the thumbnail picture data are read out from the recording medium and presented to the picture display unit in the form of contracted pictures. The user then specifies one of the displayed plural thumbnail pictures, whereby picture data corresponding to the thumbnail pictures are read out from the recording medium so as to be displayed on the picture display unit.

Also, in erasing picture data by way of the above-mentioned editing operation, it is customary practice to read out only thumb-nail picture data from the recording medium to display the data corresponding to a plurality of contracted pictures on the picture display unit. In this case, the user specifies an unneeded one of the displayed plural thumbnail pictures to erase the picture data corresponding to the thumbnail pictures from the recording medium.

Since the thumbnail picture is displayed prior to reproduction or editing of picture data, it is desirable that readout of thumbnail picture data from the recording medium shall be completed in as short a time period as possible.

However, if the recording medium used is such a recording medium for which data is read or written at a lower read/write speed, a longer time period is required in reading out the thumbnail picture data.

As a recording method for recording thumbnail picture data on the recording medium, the following three methods have customarily been used: That is, as a first method, thumbnail data is included in a header portion of a file of a photographed still picture, referred to herein as main picture data, so that the main picture and the thumbnail are recorded as a sole file. As a second method, the thumbnail is included in a separate file from the file of the main picture and recorded continuously ahead and at back of the main picture file. As a third method, the thumbnail is included in a separate file from the file of the main picture and only the thumbnail file is stored below a dedicated directory.

However, in these three methods, the following problems have been pointed out in connection with readout of the thumbnail picture data. That is, with the first method, since it is difficult to read out selectively only the thumbnail portion from the sole file, readout time is protracted if it is tried to read out only plural thumbnail pictures, so that the data buffer area has to be increased unavoidably. With the second method, since the main file is sandwiched between thumbnail picture files, frequent accessing operations are required if it is tried to read out only plural thumbnail pictures, thus protracting readout time. With the third method, if the thumbnail picture file is stored below the dedicated directory, it is not recorded in a continuous area of the recording medium, thus raising the problem similar to that encountered with the second method.

Thus, with the conventional method, if thumbnail picture data is stored on a recording medium, such as a floppy disc, on which data is read out and written at a lower speed, the accessing time and the data buffer area are increased excessively in connection with reading out plural thumbnails.

SUMMARY OF THE INVENTION

It is therefore an object of the present invention to provide a picture recording method and apparatus whereby thumbnail picture data can be read out promptly.

It is another object of the present invention to provide a picture reproducing method and apparatus whereby thumbnail picture data can be read out promptly and a picture corresponding to one of displayed plural thumbnails can be reproduced on the display unit.

In one aspect, the present invention provides a picture recording device including recording means for recording picture data and thumbnail picture data for the picture data on a disc-shaped recording medium and control means for controlling the recording means for recording the picture data from one end of the disc-shaped recording medium and for continuously recording thumbnail picture data for the picture data from the opposite end of the disc-shaped recording medium.

With the picture recording apparatus, since control means controls recording means, the picture data and the thumbnail picture data are recorded in physically discrete areas on the disc-shaped recording medium. Moreover, the thumbnail picture data are recorded continuously from one end of the disc-shaped recording medium.

With the picture recording method according to the present invention, picture data are recorded from one end of the disc-shaped recording medium, while thumbnail picture data for the picture data are continuously recorded from the opposite end of the disc-shaped recording medium.

With the present picture recording method, the picture data and the thumbnail picture data are recorded in physically discrete areas on the disc-shaped recording medium, while thumbnail picture data are continuously recorded from one end of the disc-shaped recording medium, thus enabling prompt readout of the thumbnail picture data.

In another aspect, the present invention provides a picture reproducing apparatus including readout means for reading out picture data recorded from one end of a disc-shaped recording medium and thumbnail picture data continuously recorded from the other end of the disc-shaped recording medium, storage means for storing the thumbnail picture data or the picture data read out from the readout means, reproducing means for reproducing the thumbnail picture data or the picture data stored in the storage means, display means for displaying the picture data and the thumbnail picture data reproduced by the reproducing means, control means for controlling the readout means, storage means, reproducing means and the display means, and command input means for issuing a command to the control means. The control means controls the readout means, storage means, reproducing means and the display means for reading out all of the thumbnail picture data recorded on the disc-shaped recording medium by the readout means, storing all of the read-out thumbnail picture data in the storage means, reproducing a pre-set number of the thumbnail pictures from all of the read-out thumbnail picture data for display on the display means, reading out from the disc-shaped recording medium the picture data corresponding to the sole thumbnail designated by the command input means, reproducing the read-out data and displaying the reproduced data.

In yet another aspect, the present invention provides a picture reproducing method including reading out all of thumbnail picture data continuously recorded from one end of a disc-shaped recording medium, storing all of the read-out thumbnail picture data in storage means, reproducing a pre-set number of thumbnail pictures from all of the stored thumbnail picture data, displaying the pre-set number of thumbnail pictures on displaying means, designating one of the pre-set number of thumbnail pictures, reading out picture data corresponding to the designated thumbnail from the disc-shaped recording medium, reproducing the read-out picture data and displaying the reproduced picture data on the display means.

With the picture reproducing method and apparatus of the present invention, the thumbnail picture data associated with plural picture data present in physically contiguous areas of the disc-shaped recording medium are read out without delay and displayed, such that a picture associated with the displayed one of the plural thumbnails can be reproduced promptly.

BRIEF DESCRIPTION OF THE DRAWINGS

FIG. 7 illustrates hysteresis of the recording state of a magnetic disc.

FIG. 8 illustrates a thumbnail management table.

DESCRIPTION OF PREFERRED EMBODIMENTS

Figure 1:
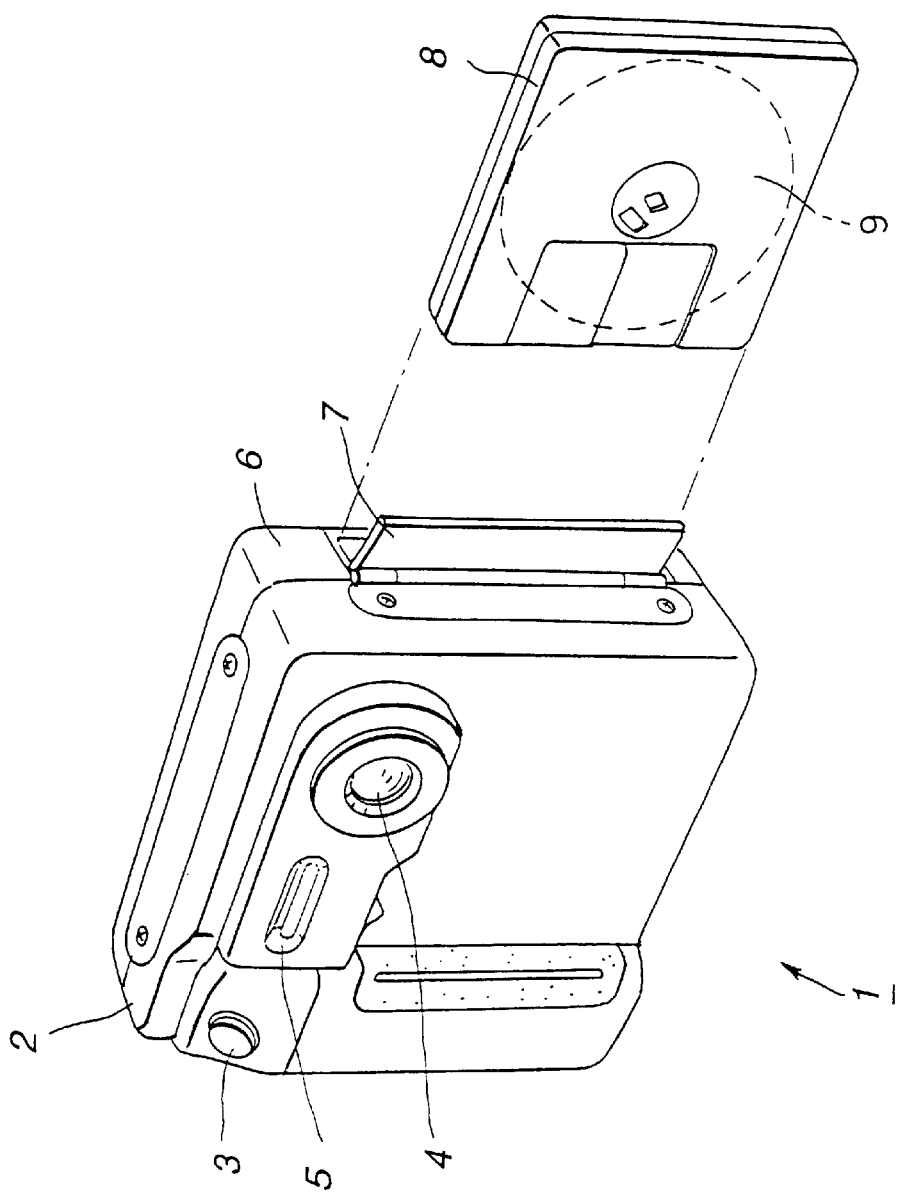
FIG. 1 is a perspective view from the front side for illustrating a digital camera apparatus embodying the present invention.

Referring to the drawings, preferred embodiments of the present invention will be explained in detail. A digital camera device 1, embodying the present invention, is of a portable size and a substantially parallelepipedic shape, as shown in FIG. 1 showing the appearance of the device from the front side. In the present digital camera device 1, a shutter button 3, an objective lens 4 and a flash device 5 are mounted on an upper portion of a casing 2. The shutter button 3 can be pressed with an index finger of the user's right hand.

Figure 2:
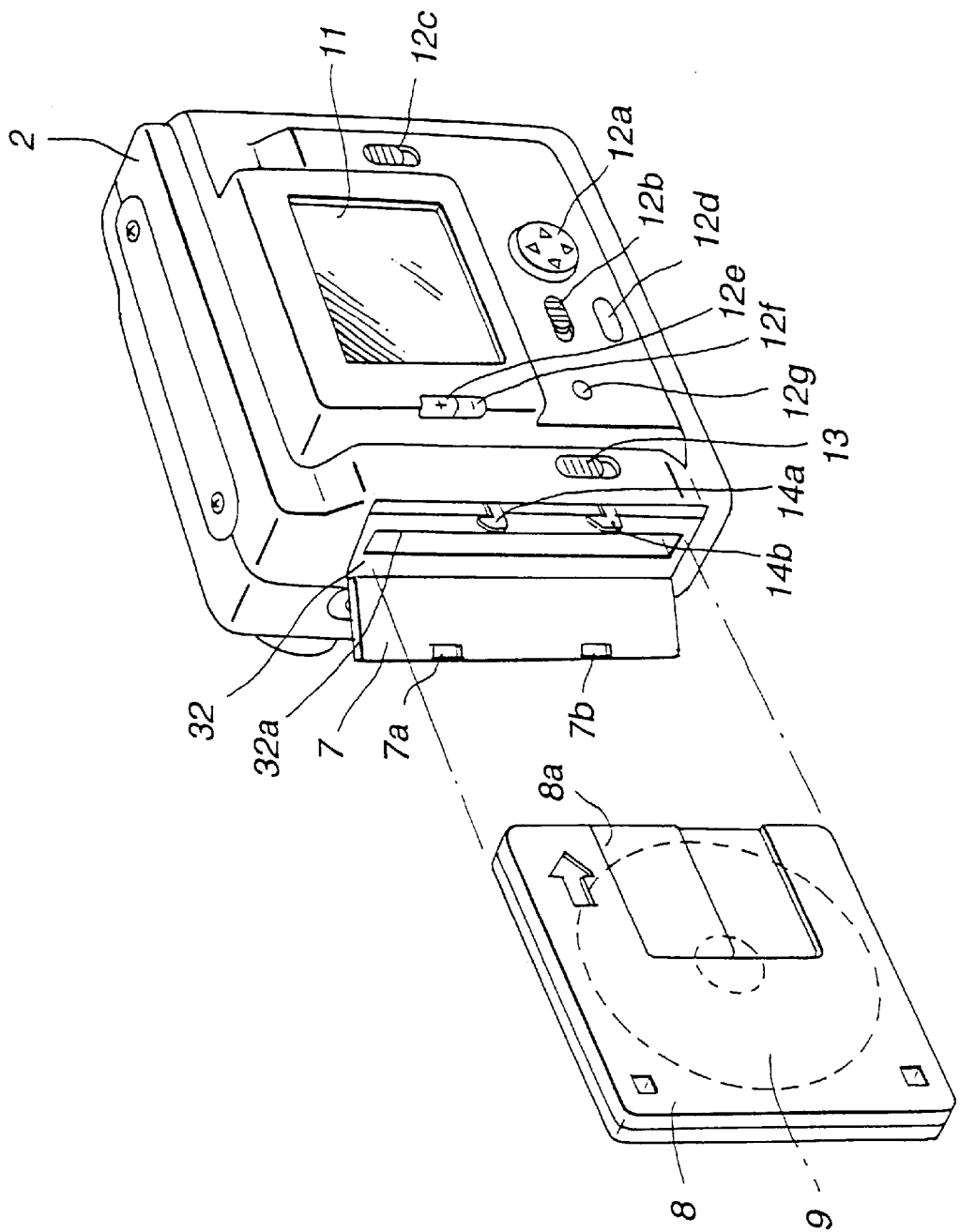
FIG. 2 is a perspective view from the back side for illustrating the digital camera device.

On a lateral surface 6 of the casing 2 of the digital camera device 1 is mounted an opening/closing lid 7. From the lateral surface 6, a floppy disc cartridge 8 holding a floppy magnetic disc 9 of the size of 3.5 inch can be loaded into the inside of the casing 2. This floppy magnetic disc 9 is referred to herein simply as a magnetic disc 9. Specifically, as shown in FIG. 2 showing the appearance from the back side of the digital camera device 1, there is arranged in the inside of the casing 2 a floppy disc drive 32 which will be explained subsequently in detail. The floppy disc cartridge 8 is inserted via a cartridge inserting opening 32a of the floppy disc drive 32 from the side of a shutter 8a.

On the back side of the casing 2 of the digital camera device 1 is mounted a Liquid Crystal Display panel (LCD panel 11) on which an object is displayed during photographing. If, in the digital camera device 1, the object is photographed by pressing the shutter button 3, there are recorded on a magnetic disc 9 in the floppy disc cartridge 8 loaded on the floppy disc drive 32 picture data of the object (main picture data) and thumbnail picture data operating as an index for the main picture data in the form of files having extensions [.JPG] and [.411], respectively.

During reproduction of the main picture data after photographing the object, a thumbnail picture for thumbnail picture data recorded on the magnetic disc 9 is displayed for a pre-set number of pictures, such as six pictures, on the LCD display 11. If a particular one of the thumbnail pictures is designated, the main picture data corresponding to the thumbnail picture are read out from the magnetic disc 9 so as to be displayed on the LCD panel 11.

The digital camera device 1 can erase unneeded main picture data and the thumbnail picture data recorded on the magnetic disc 9 or change the arraying manner of the thumbnail pictures displayed on the LCD panel 11, by way of a variety of editing operations.

That is, in the present digital camera device 1, a variety of actuating buttons/switches 12a, 12b, 12c, 12d, 12e, 12f and 12g are arranged around the LCD panel 11. By actuating these operating buttons, zooming during photographing, designation of particular thumbnail pictures during reproduction or data erasure can be executed by way of editing operations.

The opening/closure of the opening/closing lid 7 can be achieved by vertically moving an opening/closure actuator 13 for canceling or holding the engaged state of engagement pawls 14a, 14b interlocked with the opening/closure actuator 13 with engagement portions 7a, 7b of the opening/closing lid 7.

Figure 3:
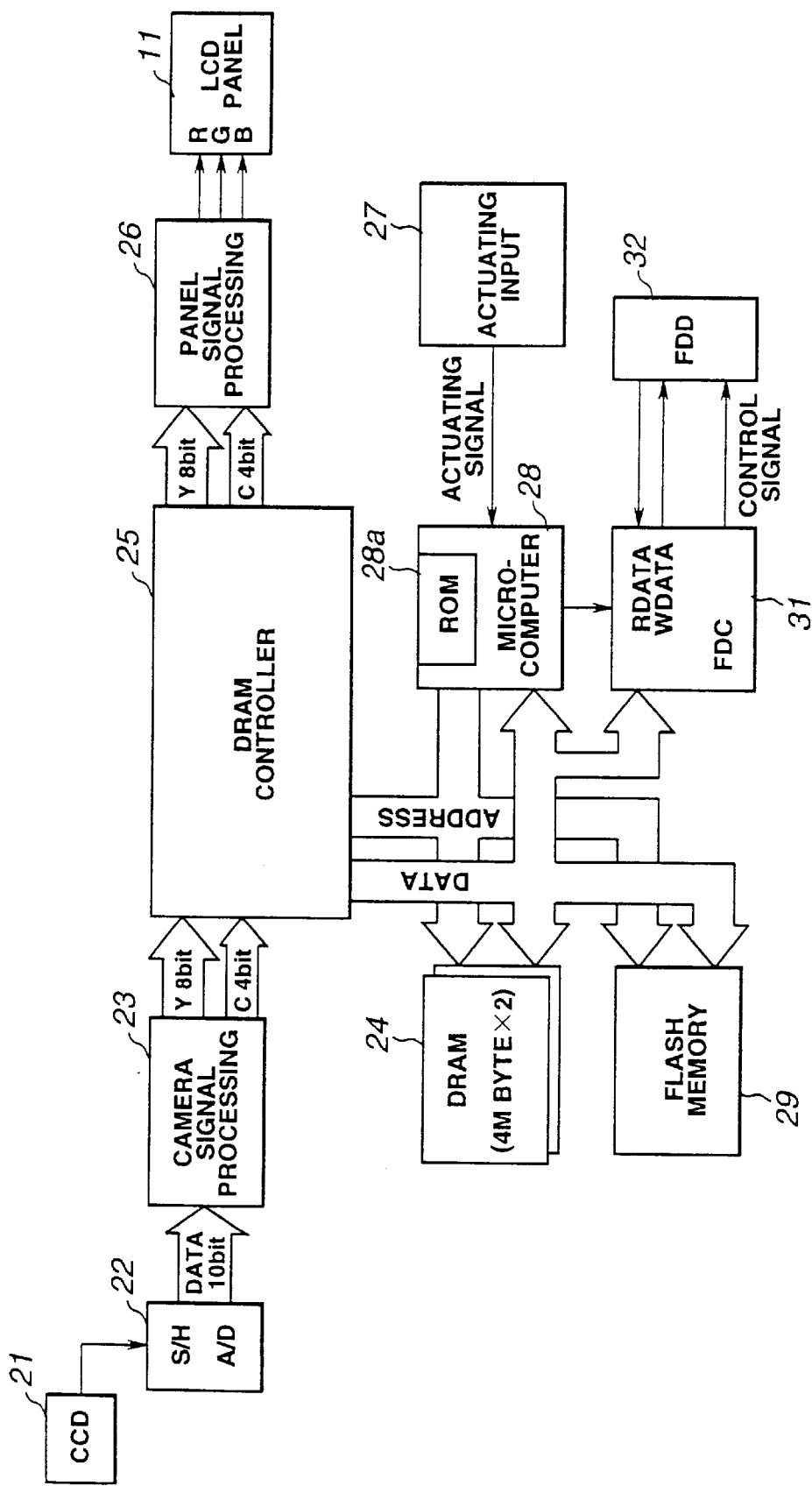
FIG. 3 is a block diagram for illustrating the electrical structure of the digital camera device.

The circuit configuration of the digital camera device 1 is hereinafter explained. Referring to FIG. 3, the present digital camera device 1 includes a CCD 21, as a photographing element, a sample-and-hold/analog-to-digital circuit, abbreviated hereinafter to a sample-and-hold circuit 22, a camera signal processing circuit 23, a DRAM 24 and a DRAM controller 25. The digital camera device 1 also includes a panel signal processing circuit 26, an actuating input unit 27, a micro-computer 28, a floppy disc controller or FDC 31 and the floppy disc drive or FDD 32, already explained with reference to FIG. 2. The panel signal processing circuit 26 furnishes RGB signals to the LCD panel 11. The digital camera device 1 also includes a flash memory 29 as an additional constituent element. The DRAM 24, DRAM controller 25, micro-computer 28, flash memory 29 and the FDC 31 are interconnected over a common bus.

In the digital camera device 1, light rays from an object are passed through the objective lens 4 and received by the CCD 21 so as to be thereby converted into electrical signals. An output signal from the CCD 21 is sample-held by the sample-and-hold circuit 22 and subsequently converted by A/D conversion into 10-bit digital signals. The converted 10-bit signals are sent to the camera signal processing circuit 23.

The camera signal processing circuit 23 processes the 10-bit digital signals supplied from the sample-and-hold circuit 22 in a pre-set manner to output the processed signals to the DRAM controller 25. The camera signal processing circuit 23 in the present embodiment generates 8-bit luminance signals Y and 4-bit chroma signals C from the input signal to output the signals Y and C to the DRAM controller 25.

The DRAM controller 25 directly sends the luminance signals Y and the chroma signals C from the camera signal processing circuit 23 to the panel signal processing circuit 26. If the CCD 21 is not of the tetragonal lattice structure, the camera signal processing circuit 23 forms the luminance signals Y and the chroma signals C into signals of the tetragonal lattice structure to send the resulting signals to the panel signal processing circuit 26, which then generates red signals R, green signals G and blue signals B from the input luminance signals Y and chroma signals C to output the R, G and B signals to the LCD panel 11. This displays an image of the photographing object on the LCD panel 11.

The DRAM controller 25 also causes the luminance signals Y and the chroma signals C from the camera signal processing circuit 23 in pre-set areas of the DRAM 24 under control from the camera signal processing circuit 23. The DRAM 24 is made up of two 4 MB DRAMs, and thus has a storage area of 8 MBs.

The actuating input unit 27 detects the actuation contents of the shutter button 3 and the actuating buttons/switches 12a to 12g to output the detected signals as actuating signals to the micro-computer 28.

The micro-computer 28 is of the reduced instruction set computer RISC type capable of high-speed processing, and includes a read-only memory (ROM) 28a holding on memory a software program for controlling the respective blocks. The micro-computer 28 is responsive to actuating signals from the actuating input unit 27 to cause the software program in the ROM 28a to be executed to perform the processing such as picture comparison or file management during the photographing, reproduction and editing.

Specifically, the micro-computer 28 causes the luminance signals Y and the chroma signals C to be stored during photographing of an object in a pre-set area of the DRAM 24 from the DRAM controller 25 in order to compress the stored luminance signals Y and chroma signals C in accordance with the JPEG (Joint Photographic Coding Experts Group) system. The micro-computer 28 also causes the data compressed in accordance with the JPEG system to be written in an area different from the above-described area of the DRAM 24 as JPEG stream data. The micro-computer 28 also causes JPEG stream data to be read out from the DRAM 24 to convert the JPEG stream data into MS-DOS (Microsoft Disc Operating System, a trademark owned by Microsoft Inc.) format data to supply the converted data to the FDC 31. The micro-computer 28 controls the FDC 31 in order to write the data converted into the MS-DOS format data on a magnetic disc 9 of the floppy disc cartridge 8 loaded on the floppy disc drive 32.

The flash memory 29 is used for storage of the version-up program in case of version-up of the function of the digital camera device 1, and represents an additional constituent element in the present embodiment.

Figure 4:
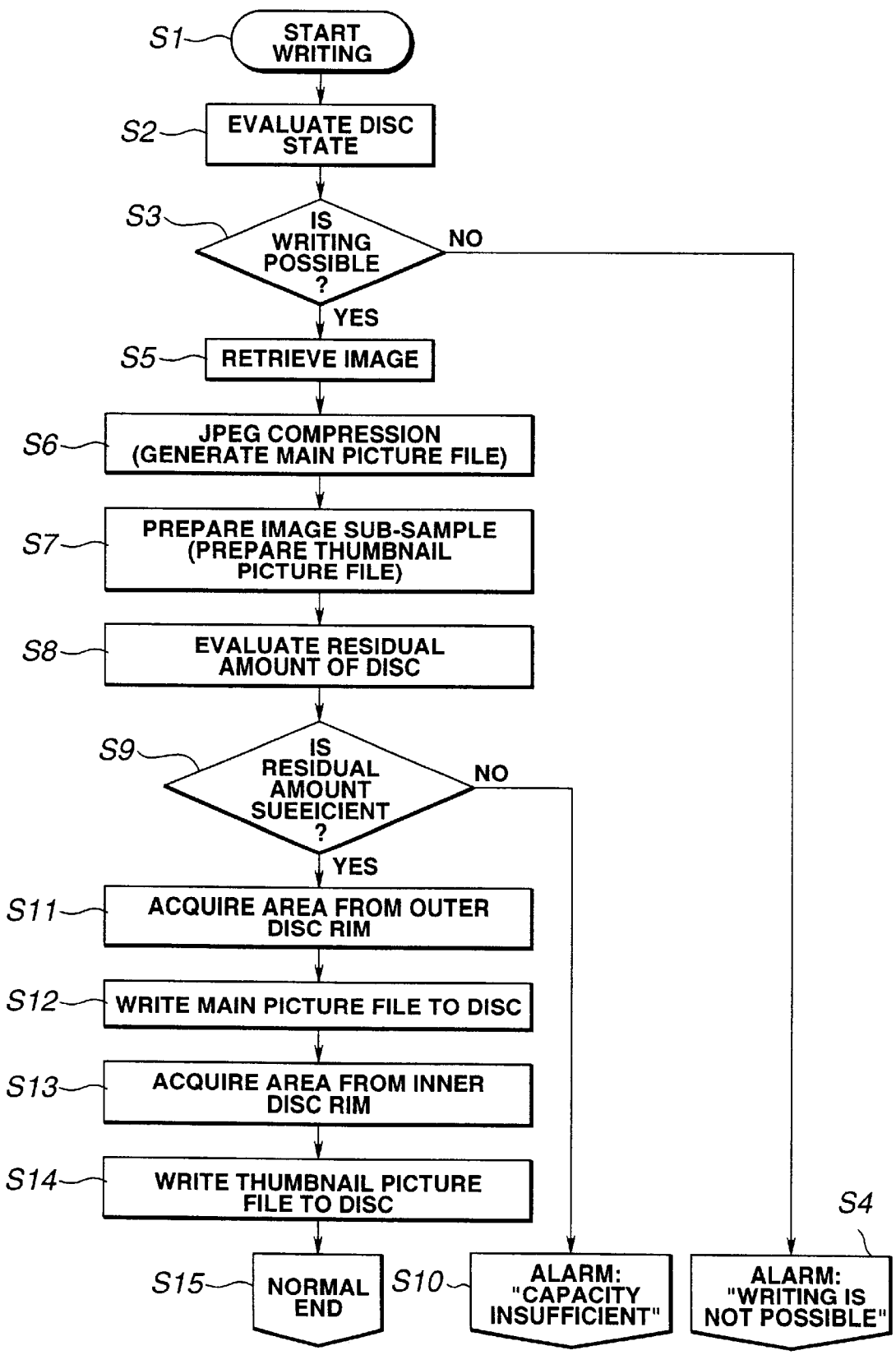
FIG. 4 is a flowchart for illustrating the control operation during recording of the main picture data and the thumbnail picture data.

The control operation during data recording of the digital camera device 1 is explained by referring to the flowchart of FIG. 4.

The micro-computer 28 enters at step S1 into the write mode to execute a series of processing operations of steps S2 to S15 now to be explained.

At step S2, the micro-computer 28 evaluates the state of the magnetic disc 9. In evaluating the magnetic disc 9, it is checked whether or not the floppy disc cartridge 8 has been loaded in position, and whether or not the magnetic disc 9 in the loaded floppy disc cartridge 8 is normal.

At the next step S3, the micro-computer 28 checks whether or not the floppy disc cartridge 8 is write-protected, in order to judge whether or not writing on the magnetic disc 9 is possible. If it is judged that writing is possible, processing transfers to step S5 and, if otherwise, to step S4.

The micro-computer 28 issues an alarm that "writing is not possible" to terminate the processing. Specifically, the reason why and the effect that the writing is not possible are displayed on the LCD panel 11.

At step S5, the micro-computer 28 causes picture data obtained on photographing the object to be stored in the DRAM 24 in order to retrieve main picture data.

At the next step S6, the micro-computer 28 compresses picture data stored in the DRAM 24 in accordance with the JPEG system in order to generate main picture data and in order to formulate a file made up of the main picture data. Specifically, by this step S6, the main picture file having the above-mentioned extension [.JPG] is generated.

At the next step S7, the micro-computer 28 decimates data of the main picture data retrieved at step S5 to a pre-set data volume on the pixel basis in order to generate thumbnail picture data as a sub-sample of the main picture and in order to prepare a file composed of the thumbnail picture data. That is, by this step S7, the thumbnail picture file having the above-mentioned extension [.411] is generated. In the present embodiment, the above-mentioned main picture data is decimated so that the thumbnail picture file will be of a fixed capacity of 4806 bytes.

At the next step S8, the micro-computer 28 evaluates the residual recording capacity of the magnetic disc 9 prior to recording respective data.

At the next step S9, the micro-computer 28 compares the residual recording capacity of the magnetic disc 9, evaluated at step S8, to the sum capacity of the main picture file and the thumbnail picture file, prepared at steps S6 and S7, in order to judge whether or not the residual capacity of the magnetic disc 9 suffices. This allows for judgment as to whether or not the current residual capacity of the magnetic disc 9 suffices to record the main picture file and the thumbnail picture file. If it is judged that the current residual capacity suffices, processing transfers to step S11 and, if otherwise, to step S11.

At step S10, the micro-computer 28 manages control to display "the disc capacity is insufficient" on the LCD panel 11, by way of an alarm to the user, in order to terminate the processing.

At step S11, the micro-computer 28 secures an area from the outer rim side of the magnetic disc 9 to determine an area for recording the main picture file.

At the next step S12, the micro-computer 28 controls the FDC 31 in order to write the main picture file by the floppy disc drive 32 on the area of the magnetic disc 9 as determined at step S11.

At the next step S13, the micro-computer 28 secures an area from the inner rim of the magnetic disc 9 in order to determine an area for recording the thumbnail picture file.

At the next step S14, the micro-computer 28 controls the FDC 31 to write the thumbnail picture file by the floppy disc drive 32 in the area of the magnetic disc 9 as determined at step S13. After end of the processing, the micro-computer 28 proceeds to step S15 to terminate the above-described sequence of operations.

Figures 5A, 5B:
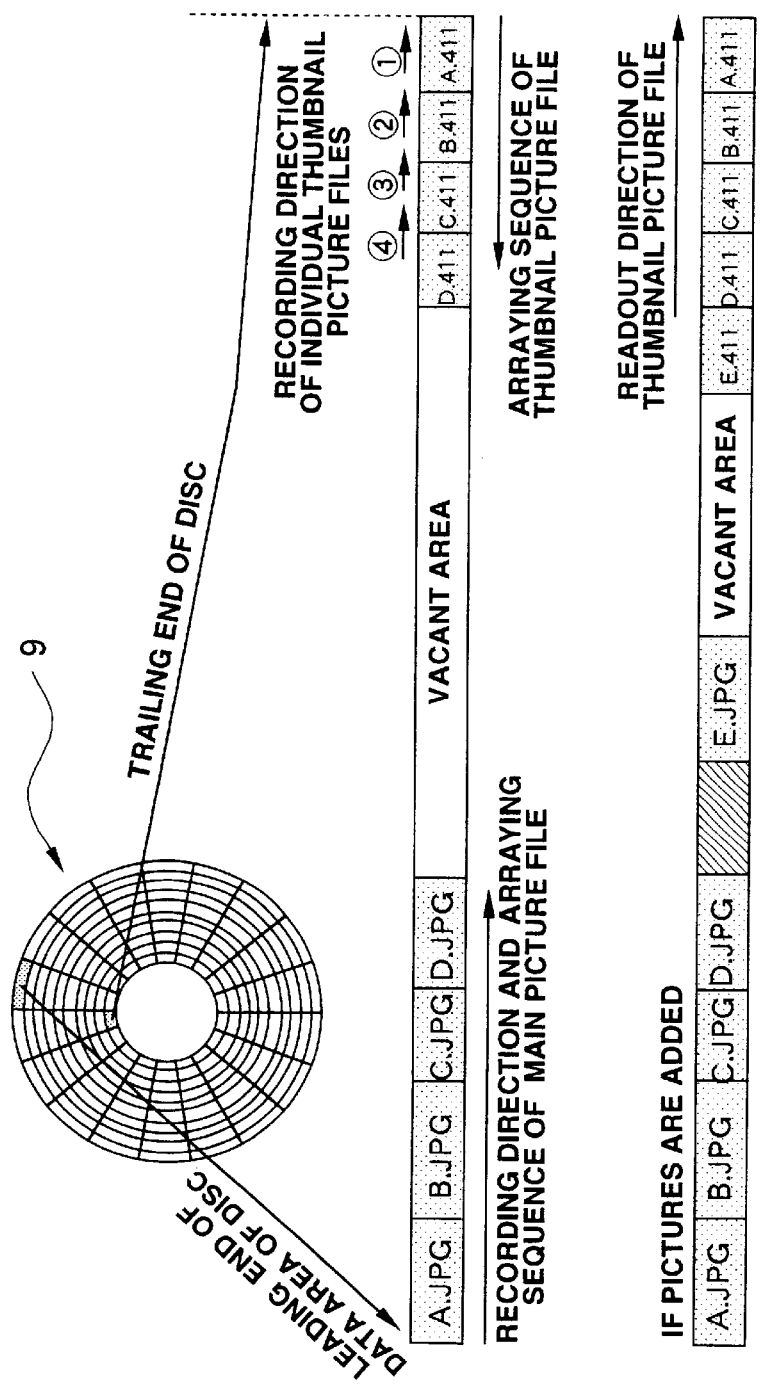
FIG. 5 shows the state of a main picture file and a thumbnail picture file recorded on a magnetic disc.

By the above-described processing, the main picture file and the thumbnail picture file are recorded from both ends of the disc, as shown in FIG. 5A, which shows the manner of recording of thumbnail picture file as A.411, B.411, C.411 and D.411 in case of recording four main picture files A.JPG, B.JPG, C.JPG and D.JPG, respectively.

That is, in the present digital camera device 1, the main picture files are sequentially recorded and arrayed, beginning from the leading end of the disc data area, at the same time as the thumbnail picture files are sequentially recorded beginning from the trailing end of the data area. Meanwhile, the recording direction of the individual thumbnail picture files, that is the data writing direction, is the same as the recording direction of the main picture files.

When recording data on the magnetic disc 9 in the non-recorded vacant state, the main picture files and the thumbnail picture files are alternately recorded in physically discrete areas of the magnetic disc 9, while the thumbnail picture data are continuously recorded from one end of the data area of the magnetic disc 9, so that plural thumbnail picture data can be read out promptly as if the data are a sole file, thus significantly reducing the readout time.

Also, since the thumbnail picture data only are recorded in a lump state, redundant data processing is eliminated. Moreover, since it is unnecessary for the main picture file to have the thumbnail information, there is no necessity for having dependence upon the file format of the main picture file.

As for the digital camera device 1, since the main picture files are recorded beginning from the position on the disc opposite to the thumbnail picture files, there is only one comprehensive vacant area on the magnetic disc 9 to allow for effective utilization of the entire data area of the magnetic disc 9 during data recording.

Meanwhile, since the magnetic disc 9, on which the respective data have been recorded by the present digital camera device 1, conforms to the MS-DOS format, data can be copied as usual by the DiscCopy command.

FIG. 5B shows the case in which E.JPG as the fifth main picture file and E.411 as the thumbnail picture file of the main picture file have been additionally recorded beginning from the state of FIG. 5A. Since there is some other data in this case downstream of the fourth main picture file D.JPG on the magnetic disc 9, the probability is high that the fifth thumbnail picture file E.411 shall be recorded in continuation to D.411 even if the recorded fifth main picture file E.JPG is not consecutive to D.JPG. Since the files are usually recorded with the floppy disc drive beginning from the outer rim of the disc, it is a frequent occurrence that the inner rim side of the disc is in an intact state.

Moreover, since the thumbnail picture file has a fixed capacity, the thumbnail picture file F.411, which should be recorded next to the thumbnail picture file C.411, deleted by editing, can be recorded in an area in which this thumbnail picture file C.411 was previously recorded. With the present digital camera device 1, if a specified thumbnail picture file is erased to produce a non-consecutive area for the thumbnail picture files on the magnetic disc 9, a new thumbnail picture file is recorded at the same time on the occasion of next recording in the non-consecutive area produced due to erasure of the thumbnail picture file. This recording method assures continuity of the respective thumbnail picture files on the magnetic disc 9, as will be explained in detail by taking specified examples.

The readout control of the thumbnail picture file at the time of reproduction with the digital camera device 1 is explained with reference to FIG. 6.

In the digital camera device 1, the series of operations of steps S21 to S30, as now explained, are executed after entering the thumbnail readout mode.

The micro-computer 28 controls the FDC 31 at step S21 to cause the floppy disc drive 32 to reproduce the track 00 at the outermost side of the magnetic disc 9 to start reading out the information on the thumbnail files. The micro-computer 28 then proceeds to step S22.

At this step S22, the micro-computer 28 extracts file names of the effective thumbnail picture files. Specifically, the micro-computer 28 refers to the route directory area of the track 00 and the File Allocation Table (FAT) area to search the relation between the thumbnail picture files and the main picture files in order to judge whether or not the thumbnail picture file is effective based on possible presence of the associated main picture file and in order to extract only the filenames of the effective thumbnail picture file. If the check into the relation between the thumbnail picture files and the main picture files reveals that there is no thumbnail picture file associated with the pre-set main picture file, the micro-computer 28 records the information such as the filenames of the main picture file.

At the next step S23, the micro-computer 28 controls the FDC 31 to array the filenames of the extracted effective thumbnail picture files in the order of physical addresses of the magnetic disc 9.

At the next step S24, the micro-computer 28 formulates a thumbnail management table configured for relating the address of each thumbnail picture file with the main picture files as will be explained subsequently in detail. If there is no thumbnail picture file associated with the pre-set main picture file, as discussed in connection with the step S22, a blank image file, which will be explained in detail subsequently, is allocated to the pre-set main picture file on the occasion of formulation of the thumbnail management table.

At the next step S25, the micro-computer 28 controls the FDC 31 to read out by the floppy disc drive 32 one of the thumbnail picture files located on the inner rim of the magnetic disc 9 in order to store the read-out thumbnail picture file in a pre-set area of the DRAM 24. The micro-computer 28 then proceeds to step S26.

At this step S26, the micro-computer 28 judges whether or not the processing at step S25 has come to a close normally, that is whether or not a sole thumbnail picture file has been read out normally. If the processing is found to have come to a close normally, the micro-computer 28 proceeds to step S28 and, if otherwise, to step S27.

At step S27, to which the micro-computer 28 proceeds after finding that the processing at step S26 has not been terminated normally, the micro-computer 28 performs the processing on the assumption that there is no thumbnail picture file. The micro-computer 28 then proceeds to step S28. Specifically, the micro-computer 28 modifies the thumbnail management table and sets a pointer of establishing association with the above-mentioned blank image.

At step S28, the micro-computer 28 judges whether or not the thumbnail picture files have been read out up to the last file. If the result of judgment is affirmative, the micro-computer 28 proceeds to step S30 to terminate the processing and, if otherwise, to step S29.

At step S29, the micro-computer 28 prepares for reading out the next thumbnail picture file before reverting to the above-mentioned step S25. Thus, the micro-computer 28 repeats the processing from step S25 to step S29 until reading all effective thumbnail picture files.

The operation for reproduction in case data have been deleted from the magnetic disc is explained by referring to the drawings. FIG. 7 shows hysteresis concerning data recording and deletion on or from a given magnetic disc 9a.

That is, in this magnetic disc 9a, a thumbnail picture file 005.411 associated with the fifth main picture file 005.JPG has not been recorded by some reason at the time of recording of the fifth main picture file. With the present magnetic disc 9a, the main picture file 003.JPG and the associated thumbnail picture file 003.411 are deleted after recording the main picture files 001.JPG to 009.JPG and the associated thumbnail picture files 001.411 to 009.411 excluding 005.411 and the main picture file 010.JPG and the associated thumbnail picture file 010.411 are recorded after such deletion.

Figure 6:
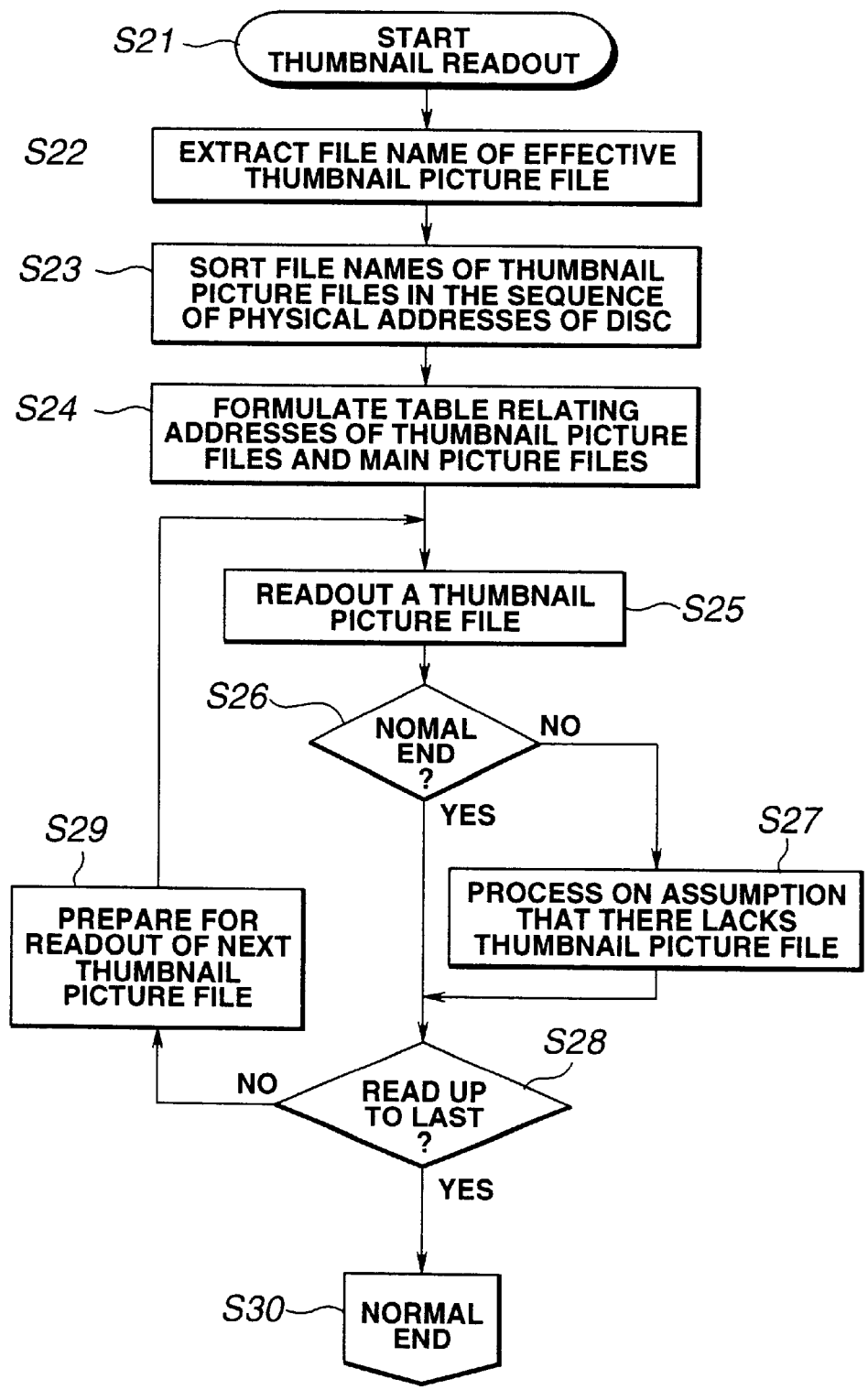
FIG. 6 is a flowchart for illustrating readout control of a thumbnail picture file during reproduction in a digital camera device.

The operation during reproduction of the present magnetic disc 9a is explained by referring to the flowchart of FIG. 6.

At step S21, reproduction of the track 00 of the magnetic disc 9a is started by the floppy disc drive 32.

At step S22, 001.411, 002.411, 004.411, 006.411, 007.411, 008.411, 009.411 and 010.411 are extracted as filenames of effective thumbnail picture files. Since there is no thumbnail picture file (005.411) associated with the main picture file 005.JPG, a pointer is set at the filename of the main picture file 005.JPG.

At the next step S23, the filenames of the extracted effective thumbnail picture files are re-arrayed in the order of the physical addresses in the magnetic disc 9. In this case, the re-arraying sequence is 009.411, 008.411, 007.411, 006.411, 004.411, 010.411, 002.411 and 001.411. That is, since the thumbnail picture files are recorded beginning from the innermost rim of the magnetic disc 9a and 010.411 is recorded after deleting 003.JPG and 003.411, the thumbnail picture file 010.411 is recorded in an area between the thumbnail picture file 004.411 and 002.411.

At step S24, the thumbnail management table shown for example in FIG. 8 is formulated. This thumbnail management table has columns for file numbers, main picture files and the associated thumbnail addresses. In the present embodiment, the columns of the file numbers and the main picture files are arrayed in the recording sequence of the main picture files. In the column of the associated thumbnail addresses is stated the leading address of an area for storage in the DRAM 24 in accordance with the sequence of the re-arraying performed at step S23. As for the main picture file 005.JPG, for which there lacks the associated thumbnail picture file, a leading address of, for example, 0, is recorded as the leading address of the area on the DRAM 24 in which is stored the blank image file.

At the next step S25, the thumbnail picture file 009.411, located at the outer rim of the magnetic disc 9a, is read out and stored in an area up to an address number of a~b−1 of the DRAM 24. At step S26, it is judged that this thumbnail picture file has been read out normally. If the thumbnail picture file 009.411 has not been read out normally at step S25, the column of the address of the associated thumbnail in the thumbnail management table is rewritten at step S27 to 0.

Figure 9:
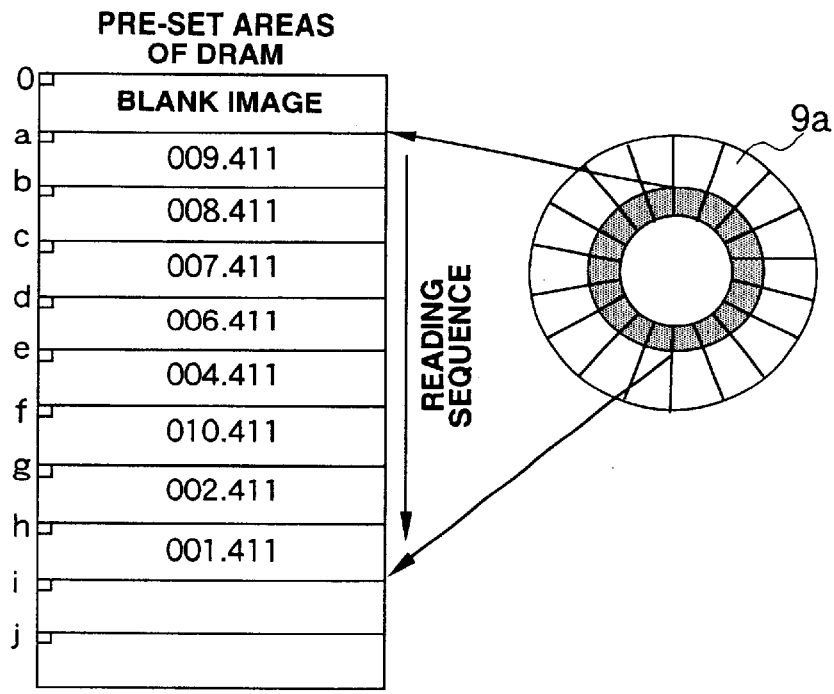
FIG. 9 illustrates the state in which the thumbnail picture file has been stored from the magnetic disc to a pre-set area on the DRAM.
Figure 10:
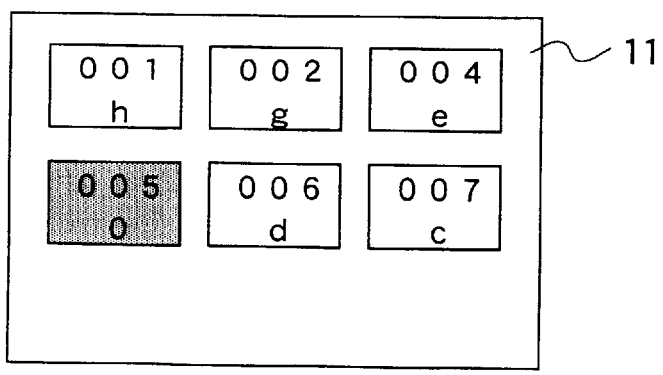
FIG. 10 illustrates the state in which a thumbnail and so forth have been displayed on the LDC panel.

At step S28, it is not all thumbnail picture files that are read out. Thus, processing transfers to step S29 to repeat the processing at steps S25 to S29 so that the thumbnail picture files are stored in a pre-set area of the DRAM 24 in the sequence of 008.411, 007.411, 006.411, 004.411, 010.411, 002.411 and 001.411, as shown in FIG. 9.

Since the thumbnail picture file 005.411 has not been recorded in the magnetic disc 9a, 006.411 is read after 004.411 in the pre-set area of the DRAM 24. Since there is the main picture file devoid of the thumbnail picture file on the magnetic disc 9a, a blank image displayed in place of the thumbnail file in the absence thereof is stored in a pre-set area (area a~b−1 in FIG. 9) of the DRAM 24.

After all of the thumbnail picture files in the magnetic disc 9a have been stored in the DRAM 24, the micro-computer 28 controls the DRAM controller 25 and the panel signal processing circuit 26 for displaying six thumbnails on the LCD panel 11. Reference is had at this time to the thumbnail management table in order to display the thumbnails on the LCD panel 11.

This causes six thumbnails to be displayed on the LCD panel 11. Since there is no thumbnail picture file associated with 05.411, the filename of the main picture may be displayed in a grey picture having the same size as other photographed pictures.

With the digital camera device 1, the main picture file associated with one of the six displayed thumbnails is read out from the magnetic disc 9a based on the actuating signals of the actuating input unit 27. This main picture file is stored in a pre-set area of the DRAM 24 and expanded by the micro-computer 28 in accordance with the JPEG system for display subsequently on the LCD panel 11 to an enlarged size.

What is claimed is:

1. A picture recording device for recording picture data files and associated thumbnail picture data files on a recording medium having an outer rim side and an inner rim side, comprising:

(a) a controller for recording the picture data files and the associated thumbnail picture data files on the disc-shaped recording medium, said picture data files comprising picture images and said associated thumbnail picture data files comprising thumbnail picture images each of which corresponds to each of said picture images included in said picture data files; and (b) a micro-computer operative to control said controller to sequentially record the picture data files in tracks starting at the outer rim side and toward the inner rim side of the disc-shaped recording medium and to sequentially record the thumbnail picture data files in tracks starting at the inner rim side and toward the outer rim side of the disc-shaped recording medium, wherein the picture data files are recorded inwardly toward the thumbnail picture files without regard to areas on the recording medium designated to contain only thumbnail picture files or picture data files such that additional picture data files can be recorded on the recording medium inwardly toward the thumbnail picture files until unused space therebetween is used up thereby effectively forming variably-sized picture data file and thumbnail picture file areas on the recording medium depending on the selected sizes of the recorded picture data files.

2. The picture recording device as claimed in claim 1, wherein the recording medium comprises a floppy disc.

3. The picture recording device as claimed in claim 1, wherein the thumbnail picture data files have a preset length and said micro-computer is further operative to control said controller to record a subsequently generated thumbnail picture data file within an empty memory location between sequentially stored thumbnail picture data files.

4. The picture recording device as claimed in claim 3, wherein said empty memory location is caused by deletion of a previously stored thumbnail picture data file.

5. The picture recording device as claimed in claim 1, wherein the associated thumbnail picture data files are formed by reducing the data volume of the picture data files.

6. The picture recording device as claimed in claim 1, wherein the recording medium is removably insertable into the picture recording device.

7. A method of recording picture data files and associated thumbnail picture data files on a disc-shaped recording medium having an outer rim side and an inner rim side, comprising:

(a) sequentially recording the picture data files in tracks starting at the outer rim side and toward the inner rim side of the disc-shaped recording medium, said picture data files comprising picture images and said associated thumbnail picture data files comprising thumbnail picture images each of which corresponds to each of said picture images included in said picture data files; and (b) sequentially recording the thumbnail picture data files in tracks starting at the inner rim side and toward the outer rim side of the disc-shaped recording medium, wherein the picture data files are recorded inwardly toward the thumbnail picture files without regard to areas on the recording medium designated to contain only thumbnail picture files or picture data files such that additional picture data files can be recorded on the recording medium inwardly toward the thumbnail picture files until unused space therebetween is used up thereby effectively forming variably-sized picture data file and thumbnail picture file areas on the recording medium depending on the selected sizes of the recorded picture data files.

8. The method as claimed in claim 7, wherein the thumbnail picture data files have a preset length and said sequentially recording the thumbnail picture data files from the inner rim side of the disc-shaped recording medium further comprises recording a subsequently generated thumbnail picture data file within an empty memory location between sequentially stored thumbnail picture data files.

9. The method as claimed in claim 7, wherein the associated thumbnail picture data files are formed by reducing the data volume of the picture data files.

10. A picture recording device for recording picture data files and associated thumbnail picture data files on a disc-shaped recording medium having an outer rim side and an inner rim side, comprising:

(a) means for recording the picture data files and the associated thumbnail picture data files on the disc-shaped recording medium, said picture data files comprising picture images and said associated thumbnail picture data files comprising thumbnail picture images each of which corresponds to each of said picture images included in said picture data files; and (b) means for controlling said controller to sequentially record the picture data files in tracks starting at the outer rim side and toward the inner rim side of the disc-shaped recording medium and to sequentially record the thumbnail picture data files in tracks starting at the inner rim side and toward the outer rim side of the disc-shaped recording medium, wherein the picture data files are recorded inwardly toward the thumbnail picture files without regard to areas on the recording medium designated to contain only thumbnail picture files or picture data files such that additional picture data files can be recorded on the recording medium inwardly toward the thumbnail picture files until unused space therebetween is used up thereby effectively forming variably-sized picture data file and thumbnail picture file areas on the recording medium depending on the selected sizes of the recorded picture data files.

* * * * *